(12) United States Patent
Coakley et al.

(10) Patent No.: US 10,457,246 B2
(45) Date of Patent: Oct. 29, 2019

(54) CHILD RESTRAINT SYSTEM FOR JUVENILE VEHICLE SEAT

(71) Applicant: Dorel Juvenile Group, Inc., Foxboro, MA (US)

(72) Inventors: Devin J. Coakley, Bellingham, MA (US); Grant M. Mason, Wrentham, MA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 36 days.

(21) Appl. No.: 15/951,624

(22) Filed: Apr. 12, 2018

(65) Prior Publication Data

US 2018/0297551 A1 Oct. 18, 2018

Related U.S. Application Data

(60) Provisional application No. 62/484,700, filed on Apr. 12, 2017.

(51) Int. Cl.
| | | |
|---|---|---|
| *B60R 22/02* | (2006.01) | |
| *B60N 2/28* | (2006.01) | |
| *B60R 22/10* | (2006.01) | |
| *B60N 2/26* | (2006.01) | |
| *A47D 15/00* | (2006.01) | |
| *B60R 22/26* | (2006.01) | |

(52) U.S. Cl.
CPC ............ *B60R 22/024* (2013.01); *B60N 2/265* (2013.01); *B60N 2/2803* (2013.01); *B60N 2/2812* (2013.01); *B60R 22/105* (2013.01); *A47D 15/005* (2013.01); *B60R 22/26* (2013.01); *B60R 2022/266* (2013.01)

(58) Field of Classification Search
CPC .. B60R 22/024; B60N 2/2812; B60N 2/2815; B60N 2/2818
See application file for complete search history.

(56) References Cited

U.S. PATENT DOCUMENTS

| | | |
|---|---|---|
| 3,901,550 A | 8/1975 | Hamy |
| 5,061,012 A | 10/1991 | Parker et al. |
| 5,567,007 A | 10/1996 | Czernakowski et al. |
| 5,927,804 A | 7/1999 | Cuevas |
| 6,543,897 B1 | 4/2003 | Tung |
| 6,554,358 B2 | 4/2003 | Kain |
| 7,445,286 B2 | 11/2008 | Siewertsen et al. |
| 7,448,683 B2 | 11/2008 | Hendrikus |
| 7,506,929 B2 | 3/2009 | Fransen et al. |
| 7,513,575 B1 | 4/2009 | Go |
| 7,735,919 B2 | 6/2010 | Chen |
| 8,246,112 B2 | 8/2012 | Yasuda et al. |
| 8,851,514 B2 | 10/2014 | Renaudin |

(Continued)

FOREIGN PATENT DOCUMENTS

| | | | | |
|---|---|---|---|---|
| CA | 2558978 A1 | * | 3/2007 | ........... B60N 2/2812 |
| CA | 2976297 A1 | * | 8/2016 | ............. B60R 22/48 |

(Continued)

*Primary Examiner* — Timothy J Brindley
(74) *Attorney, Agent, or Firm* — Barnes & Thornburg LLP (57) ABSTRACT

A child restraint, in accordance with the present disclosure, includes a juvenile seat and a child-restraint harness. The child-restraint harness may be configured to move to make it easier for a caregiver to seat and unseat a child.

23 Claims, 6 Drawing Sheets

(56) References Cited

U.S. PATENT DOCUMENTS

| | | | |
|---|---|---|---|
| 9,114,738 B2 | 8/2015 | Franck et al. | |
| 2007/0228802 A1* | 10/2007 | Nakhla | B60N 2/2812 |
| | | | 297/469 |
| 2010/0060052 A1* | 3/2010 | Hutchinson | B60N 2/2812 |
| | | | 297/250.1 |
| 2012/0169098 A1* | 7/2012 | Spence | B60N 2/2812 |
| | | | 297/256.15 |
| 2015/0035331 A1* | 2/2015 | Sparling | B60N 2/2812 |
| | | | 297/256.15 |
| 2016/0304003 A1* | 10/2016 | Geist | B60N 2/2812 |
| 2018/0050614 A1* | 2/2018 | Gay | B60N 2/2845 |
| 2018/0257519 A1* | 9/2018 | Coakley | B60N 2/2812 |

FOREIGN PATENT DOCUMENTS

| | | | | |
|---|---|---|---|---|
| DE | 10251040 A1 * | 5/2004 | | B60N 2/2806 |
| WO | WO-2014171079 A1 * | 10/2014 | | B60R 22/105 |

* cited by examiner

CHILD RESTRAINT SYSTEM FOR JUVENILE VEHICLE SEAT

PRIORITY CLAIM

This application claims priority under 35 U.S.C. § 119(e) to U.S. Provisional Application No. 62/484,700, filed Apr. 12, 2017, which is expressly incorporated by reference herein.

BACKGROUND

The present disclosure relates to child restraints and in particular to juvenile seats for use on passenger seats in vehicles. More particularly, the present disclosure relates to a belt position management system for managing the position of restraint belts associated with a juvenile seat.

SUMMARY

According to the present disclosure, a child restraint includes a juvenile seat having a seat bottom and a seat back extending upwardly from the seat bottom. In illustrative embodiments, the child restraint also includes a child-restraint harness comprising a crotch belt and first and second side belts that can be mated with the crotch belt to restrain a child seated in the juvenile seat.

In illustrative embodiments, the child restraint also includes a side-belt mover that is located under a child seated on the seat bottom. The side-belt mover is coupled to the crotch belt and each of the first and second side belts. The side-belt mover is configured to move shoulder-gripping portions of the first and second side belts relative to the juvenile seat to make it easier for a caregiver to seat and unseat a child.

In illustrative embodiments, the side-belt mover is configured to raise shoulder-gripping portions of the side belts above the seat bottom automatically to make it easier for a caregiver to seat a child in the juvenile seat. The side-belt mover holds shoulder-gripping portions of the side belts in the raised position above the seat bottom during seating of a child to allow a caregiver to place a child on the seat bottom under the raised side belts without having to grasp the side belts manually and hold them in the raised position.

In illustrative embodiments, the side-belt mover is also configured to lower shoulder-gripping portions of the side belts toward the seat bottom after the child has been seated by the caregiver to wrap over the shoulders of the seated child in response to manual upward movement of the crotch belt held by a caregiver away from the seat bottom so as to facilitate mating engagement of the side belts with the crotch belt to restrain the seated child. Using the side-belt mover, a caregiver can seat a child in the juvenile seat and remove a child from the juvenile seat without having to handle shoulder-gripping portions of the side belts in the child-restraint harness manually.

In illustrative embodiments, the side-belt mover includes a base arranged to lie under a child seated on the juvenile seat, an actuator strap having a forward end coupled to the crotch belt, a first side-belt position changer coupled to the base, and a separate second side-belt positioner changer coupled to the base. The actuator strap is arranged to lie between the base and the seat bottom. The first side-belt position changer is coupled at an upper end to the first side belt and at a lower end to a rearward end of the actuator strap. The second side-belt position changer lies in laterally spaced-apart relation to the first side-belt position changer and includes a lower end also coupled to the rearward end of the actuator strap. The actuator strap is arranged to lie under and behind the base and the seated child and be moved relative to the juvenile seat when a caregiver moves a free end of the crotch belt that is located above the seat bottom to mate with the first and second side belts at about the waist of a child seated in the juvenile seat.

In illustrative embodiments, the first and second side-belt position changers cooperate normally to hold the first and second side belts in a raised positions above the seat bottom so that a child can be seated by a caregiver in the juvenile seat on the seat bottom and under shoulder-gripping portions of the first and second side belts without requiring that caregiver to grasp the first and second side belts manually and hold them in the raised positions above the seat bottom. After a child is seated in the juvenile seat on the seat bottom, the caregiver grasps the free end of the crotch belt and moves it upwardly away from the seat bottom and between the legs of the seated child to apply a pulling force to the forward end of the actuator strap. This pulling force is transferred to the first and second position changers to cause the first and second position changers to cooperate and move the shoulder-gripping portions of the first and second side belts to lowered positions contacting the shoulders of the seated child. The caregiver then mates the free end of the crotch belt to the first and second side belts to restrain the seated child in the juvenile seat.

In illustrative embodiments, elastic strips included in the side-belt position changers function to hold the shoulder-gripping portions of the first and second side belts normally in the raised positions above the seat bottom. After a child is seated in the juvenile seat, upward movement of the free end of the crotch belt by a caregiver away from the seat bottom to mate with the first and second side belts applies downward forces to each of the first and second side-belt position changers that are transferred to the tips of the elastic strips in the first and second side belts to cause those elastic strips to curl. Since the shoulder-gripping portions of the first and second side belts are coupled to the elastic strips to move with the strips as they are curled, the shoulder-gripping portions are pulled downwardly to wrap over the shoulders of the child that is now seated in the juvenile seat. The shoulder-gripping portions of the first and second side belts are now held in their lowered positions by the curled elastic strips to grip the shoulders of the seated child. When the free end of the crotch belt is unmated from the first and second side belts by the caregiver before the seated child is removed from the juvenile seat, the elastic strips recover their original shapes to urge the shoulder-gripping portions of first and second side belts coupled to the elastic strips to return to their raised positions above the seat bottom to facilitate removal of the child from the juvenile seat by the caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1A is view of a child restraint in accordance with the present disclosure showing an illustrative juvenile seat, an illustrative five-point child restraint harness coupled to the juvenile seat and formed to include a crotch belt, a first side belt, and a second side belt, and a side-belt mover located on the seat bottom and backrest under the child-restraint harness and showing that the side-belt mover is coupled to each of the crotch belt and shoulder-gripping portions of the first and second side belts and configured in accordance with the present disclosure to move the shoulder-gripping portions of the first and second side belts normally to raised positions shown illustratively in FIGS. 1B, 2, and 9 and diagrammatically in FIGS. 6 and 10 so that it is easy to seat a child in the juvenile seat under shoulder-gripping portions of the first and second side belts and, in response to upward movement of a free end of the crotch belt relative to a seat bottom of the juvenile seat, to lowered positions shown illustratively in FIGS. 5 and 11 and diagrammatically in FIGS. 7 and 12 in which the shoulder-gripping portions of the first and second side belts grip the shoulders of a seated child and mate with the free end of the crotch belt to restrain the seated child in the juvenile seat;

FIG. 2 is a perspective view of an illustrative child restraint in accordance with the present disclosure including a juvenile seat comprising a seat bottom and a seat back extending upwardly from the seat bottom and including a stationary backrest and a movable headrest mounted for up-and-down movement on the stationary backrest, a child-restraint harness coupled to the seat bottom and seat back and shown in an OPENED CHILD-SEATING-AND-RELEASING mode, and a side-belt mover linked to first and second side belts included in the child-restraint harness by means of tubular shoulder pads as suggested in FIG. 3 and configured to retain the first and second side belts in raised positions above the seat bottom to allow a caregiver to place a child in the seat easily under shoulder-gripping portions of the raised side belts without first having manually to spread and hold the side belts above the seat bottom and showing that a buckle provided at the free end of the crotch belt lies near the seat bottom before a child is seated in the juvenile seat;

FIG. 6 is a diagrammatic perspective view of the side-belt mover included in the child restraint of FIGS. 1-5 showing that the side-belt mover includes (1) a base that is adapted to be coupled to the juvenile seat to underlie a child seated in the juvenile seat, (2) a first side-belt position changer including a first elastic strip coupled to an upper end of the base and associated with the first side belt of the child-restraint harness, a first webbing extending along the topside of the first elastic strip to pass through a first upper slot formed in the base to locate a lower end of the first webbing under the base, several first webbing retainer clips for coupling the first webbing to the first elastic strip to allow for relative movement between the first webbing and the first elastic strips during raising and lowering of the first side belt, (3) a second side-belt position changer including a second elastic strip coupled to an upper end of the base and associated with the second side belt of the child-restraint harness, a second webbing extending along the topside of the second elastic strip to pass through a second upper slot formed in the base to locate a lower end of the second webbing under the base, several second webbing retainer clips for coupling the second webbing to the second elastic strip to allow for relative movement between the second webbing and the second elastic strips during raising and lowering of the second side belt, and (4) an actuator strap that is located under the base and coupled at a rearward end to lower ends of each of the first and second side belts and at a forward end to the crotch belt, and showing that the crotch belt extends through a lower slot formed in the base to locate a free end of the crotch belt above the base and is coupled to the actuator strap;

FIG. 7 is a diagrammatic view similar to FIG. 6 showing that movement of the free end of the crotch belt in an upward direction acts to pull the actuator strap in a forward direction so as to apply a downward force to each of the lower ends of the first and second webbings, which downward forces are transferred by the first and second webbings to the tips of the first and second elastic strips so as to cause (1) the upper portion of the first elastic strip to curl in a forward and downward direction so that the first side belt that is linked to the first elastic strip by, for example, a tubular shoulder pad, is moved from the raised position shown diagrammatically in FIG. 6 to the lowered position shown diagrammatically in FIG. 7 and (2) the upper portion of the second elastic strip to curl in a forward and downward direction so that the second side belt that is linked to the second elastic strip by, for example, a tubular shoulder pad, is moved from the raised position shown diagrammatically in FIG. 6 to the lowered position diagrammatically shown in FIG. 7.

DETAILED DESCRIPTION

Figures 1A, 1B:
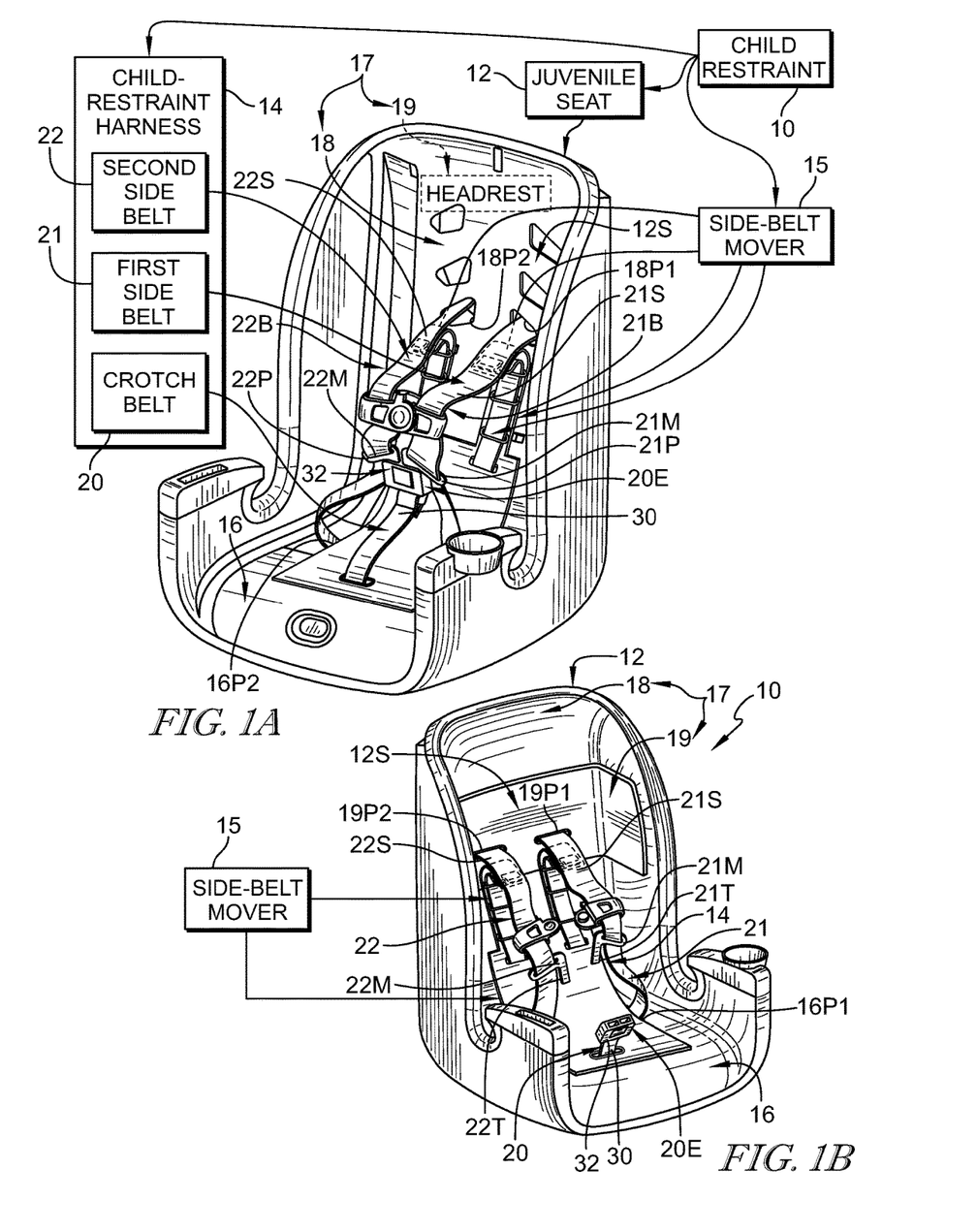
FIG. 1B is a perspective view of the juvenile seat of FIG. 1A showing operation of the side-belt mover to move shoulder-gripping portions of the first and second side belts to their raised positions above the seat bottom and showing that a buckle is included in the free end of the crotch belt and showing that each of the first and second side belts includes (1) a strap having an exposed belt section that exits from an upper slot formed in a seat back of the juvenile seat and enters a lower slot formed in the seat bottom of the juvenile seat and (2) a slidable latch plate that can slide up and down on the exposed belt section of its companion strap and includes a tongue portion that can be mated with the buckle of the crotch belt to mate the side belt to the crotch belt in the manner shown in FIG. 1A.

An illustrative child restraint 10 comprises a juvenile seat 12 and a child-restraint harness 14 including a crotch belt 20, a first side belt 21, and a second side belt 22 as shown in FIG. 1A. Child restraint 10 also includes a side-belt mover 15 for raising and lowering shoulder-gripping portions 21S, 22S of side belts 21, 22 of child-restraint harness 14 in accordance with the present disclosure as shown diagrammatically in FIGS. 1A, 10, and 12 and illustratively in FIGS. 6, 7, 9, and 11. Side-belt mover 15 functions to move portions of child-restraint harness 14 relative to juvenile seat 12 to simplify efforts of a caregiver to seat and unseat a child.

Figure 2:
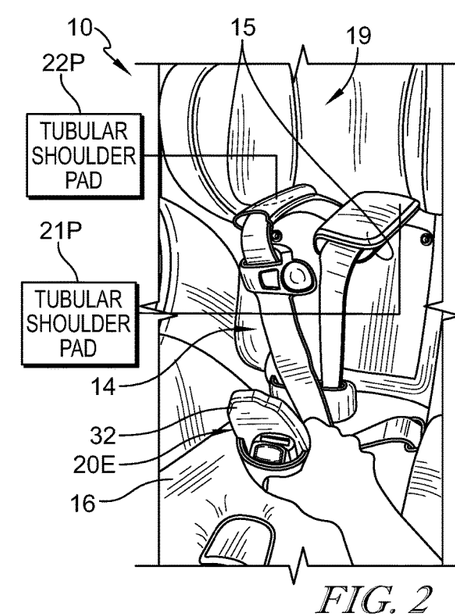
Figure 3:
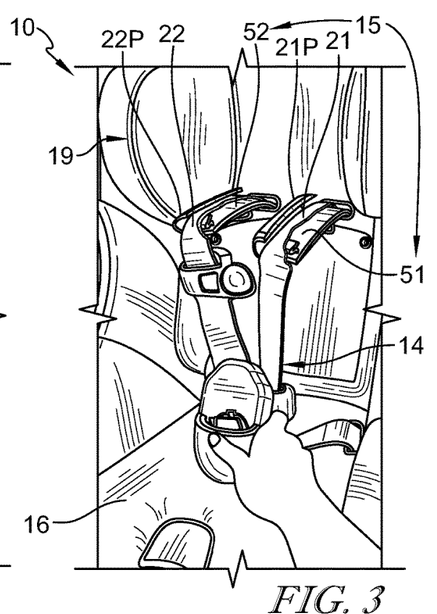
FIG. 3 is a view similar to FIG. 2 showing a caregiver beginning to move the buckle provided at the free end of the crotch belt upwardly away from the seat bottom after a child is seated in the juvenile seat to initiate actuation of the side-belt mover to cause the shoulder-gripping portions of the first and second side belts to be lowered toward the seat bottom.
Figure 4:
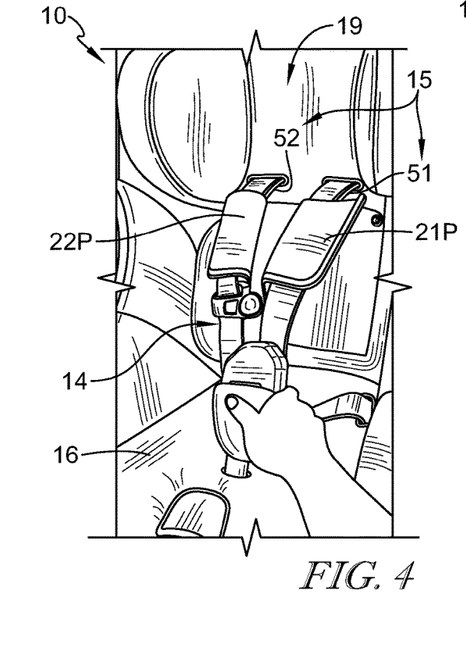
FIG. 4 is a view similar to FIG. 3 showing that the buckle provided at the free end of the crotch belt has been moved upwardly away from the seat bottom by a caregiver to cause the first and second side belts to move from raised positions shown in FIG. 2 which place the child-restraint harness in the OPENED CHILD-SEATING-AND-RELEASING mode toward the lowered positions shown in FIG. 5.
Figure 5:
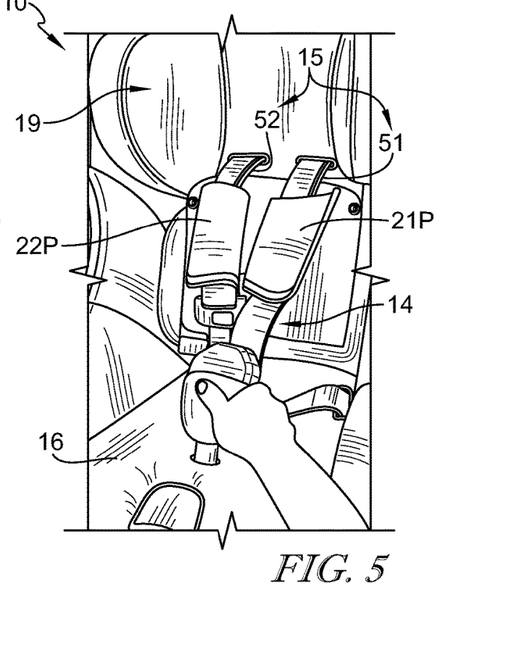
FIG. 5 is a view similar to FIG. 4 after the side belts have been moved to assume the lowered positions to place the child-restraint harness in a CLOSED CHILD-RESTRAINING mode.
Figure 6:
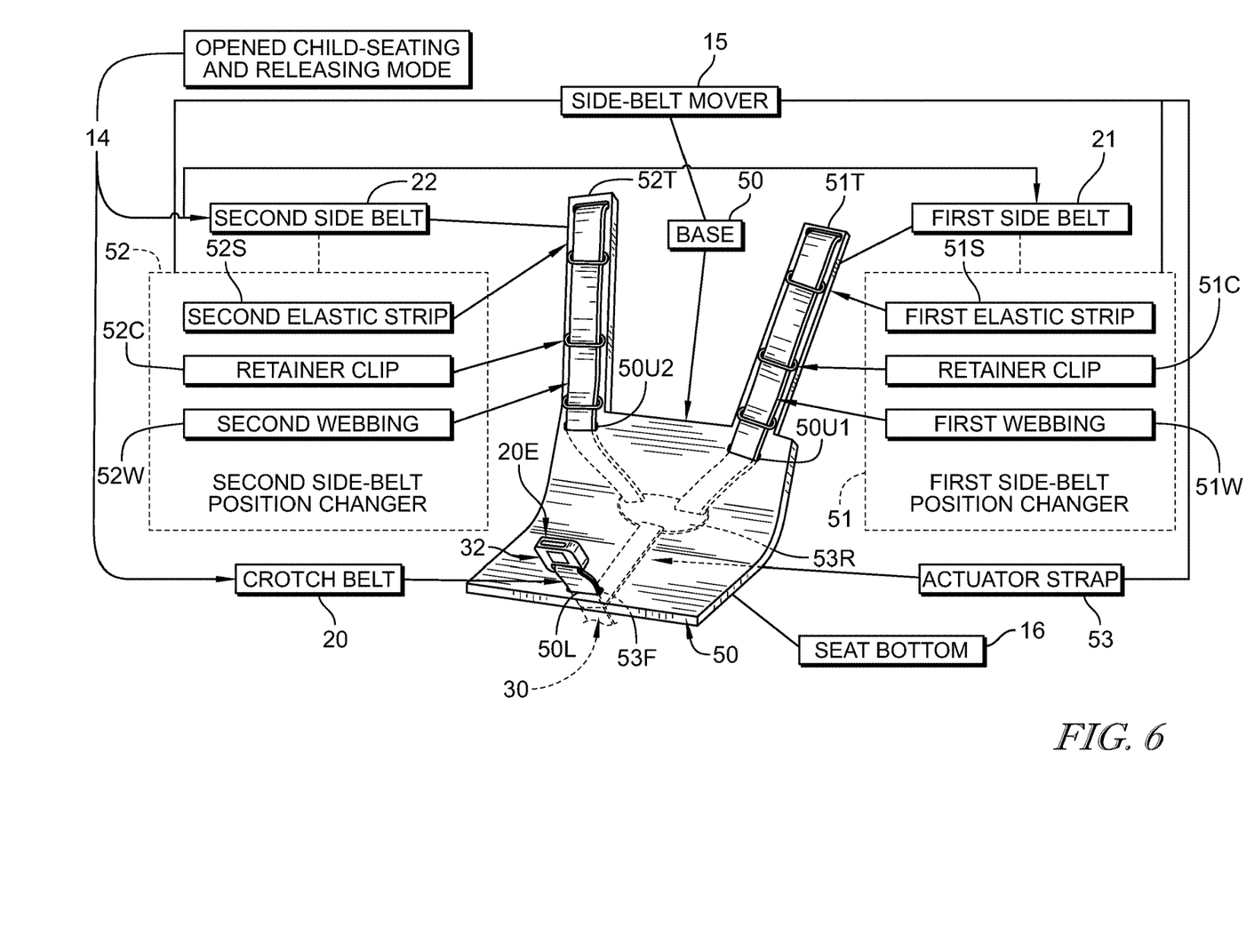
Figure 7:
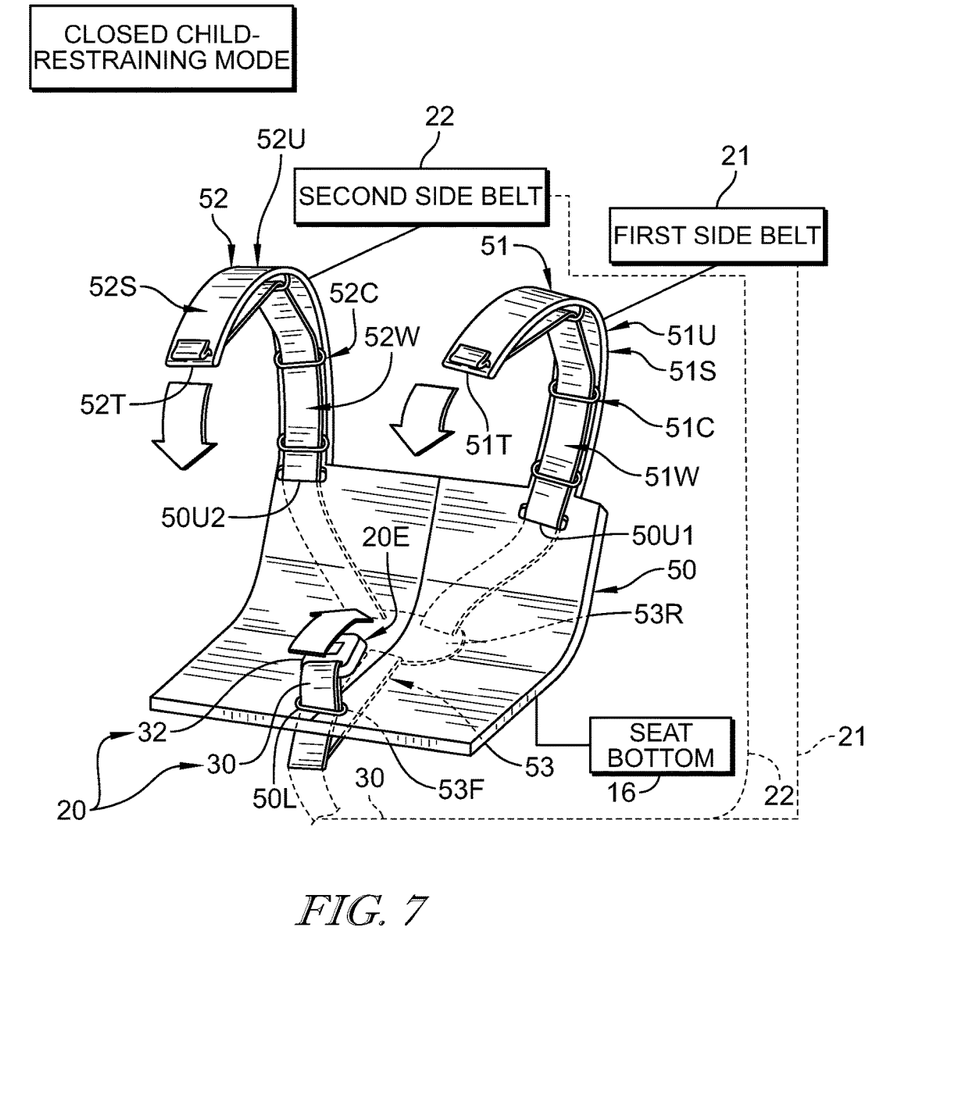
Figure 9:
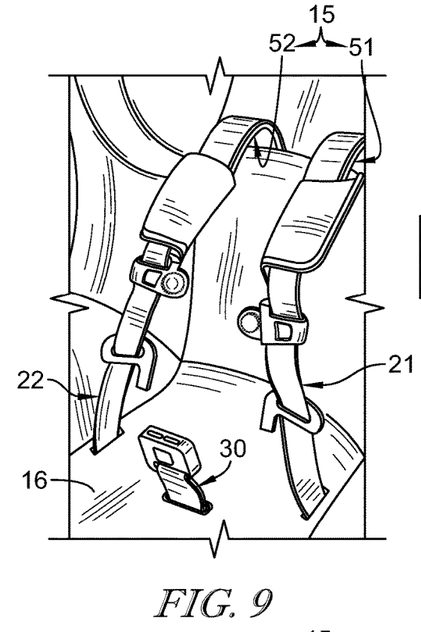
FIG. 9 is a perspective view of a portion of the child restraint of FIGS. 1-8 in an OPENED CHILD-RESTRAINT-AND-RELEASING mode.
Figure 10:
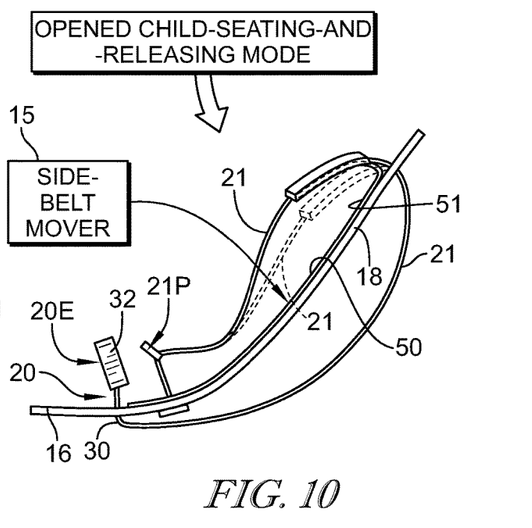
FIG. 10 is a diagrammatic side elevation view of the seat shown in FIG. 9.
Figure 11:
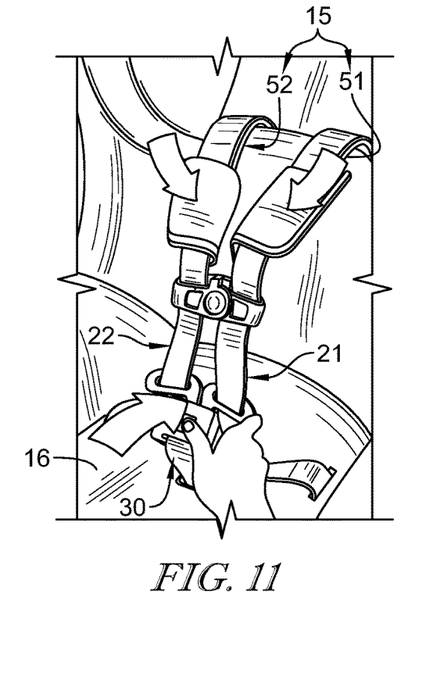
FIG. 11 is a perspective view similar to FIG. 9 showing a portion of the child restraint in a CLOSED CHILD-RESTRAINING mode.
Figure 12:
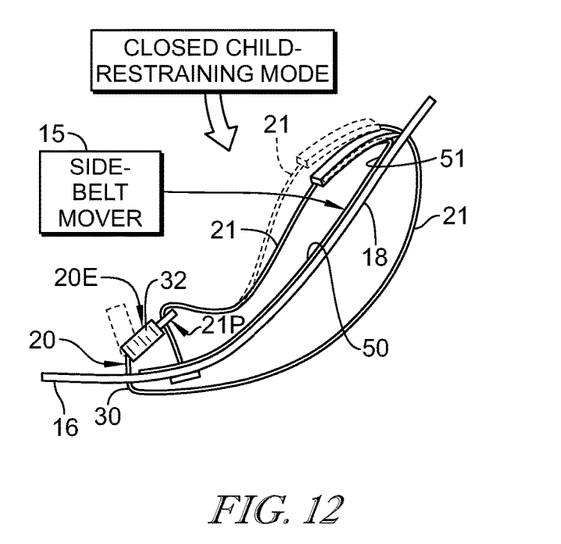
FIG. 12 is a diagrammatic side elevation view similar to FIG. 10 but illustrating the seat shown in FIG. 11.

Child-restraint harness 14 is adapted to be changed by the side-belt mover 15 from an OPENED CHILD-SEATING-AND-RELEASING mode shown illustratively in FIGS. 2 and 9 and diagrammatically in FIGS. 6 and 10 to a CLOSED CHILD-RESTRAINING mode shown illustratively in FIGS. 5 and 11 and diagrammatically in FIGS. 7 and 12 when a free end 20E of crotch belt 20 of child-restraint harness 14 is moved by a caregiver upwardly relative to juvenile seat 12 after the child has been seated in juvenile seat 12. Side-belt mover 15 functions automatically in accordance with the present disclosure to change child-restraint harness 14 back to the OPENED CHILD-SEATING-AND-RELEASING mode once the free end 20E of crotch belt 20 is unmated from first and second side belts 21, 22 of child-restraint harness 14 by a caregiver preparatory to removing the seated child from juvenile seat 12.

Juvenile seat 12 includes a seat bottom 16, a seat back 17 including a stationary backrest 18 arranged to extend upwardly from seat bottom 16, and a movable headrest 19 mounted for up-and-down movement on backrest 18 as suggested in FIGS. 1A and 1B. It is within the scope of the present disclosure to configure juvenile seat 12 to function as an infant seat or as a convertible seat for forward-facing or reward-facing use.

When juvenile seat 12 is unoccupied, as shown illustratively in FIGS. 2 and 9 and diagrammatically in FIG. 6, seat-belt mover 15 functions automatically to change child-restraint harness 14 to the OPENED CHILD-SEATING-AND-RELEASING mode.

In contrast, when juvenile seat 12 is occupied by a seated child, as suggested illustratively in FIGS. 3-5 and 11 and diagrammatically in FIGS. 7-12, side-belt mover 15 functions to change child-restraint harness 14 to the CLOSED CHILD-RESTRAINING mode in response to upward movement of the free end 20E of crotch belt 20 by the caregiver away from seat bottom 16 and toward mating engagement with first and second side belts 21, 22 of child-restraint harness 14.

Child-restraint harness 14 is illustratively a five-point harness and comprises a crotch belt 20, a first side belt 21, and a second side belt 22 as shown in FIGS. 1A and 1B. Crotch belt 20 is coupled to seat bottom 16 as suggested in FIGS. 1A and 1B. First and second side belts 21, 22 are coupled to seat bottom 16 and seat back 17 as suggested in FIGS. 1A and 1B and to crotch belt 20 as suggested in FIGS. 7 and 8.

Figure 8:
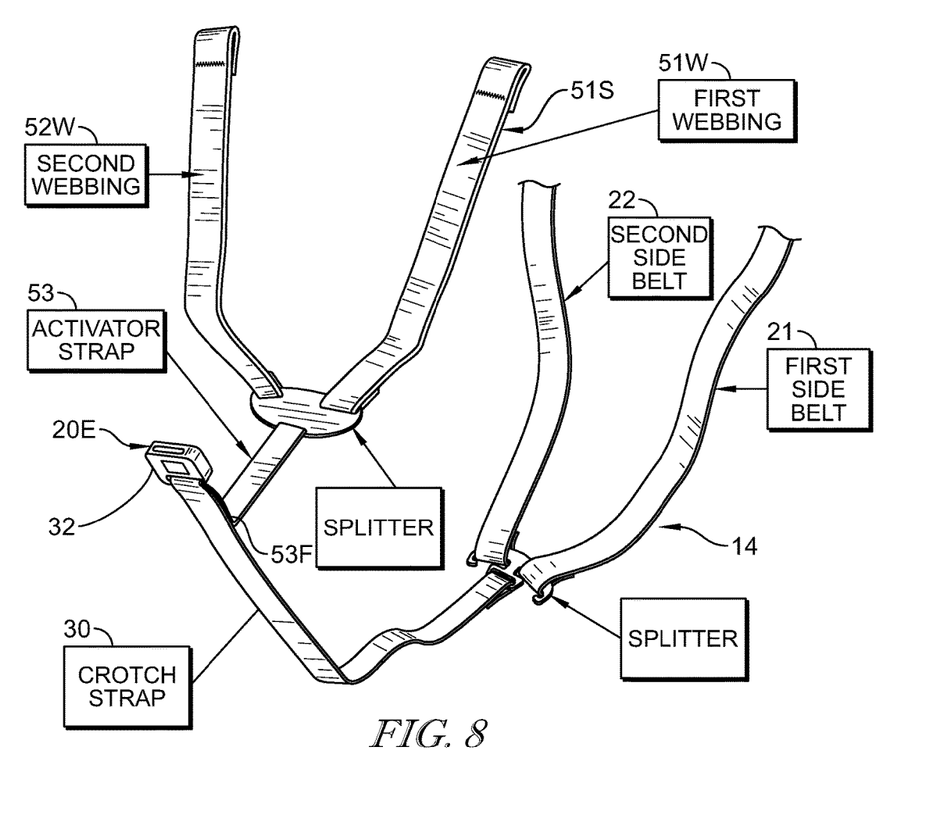
FIG. 8 is a perspective view of the straps, webbing, and belts included in the child-restraint harness and the side-belt mover.

First side belt 21 is coupled to backrest 18 of seat back 17 and arranged to pass through a first side-belt passageway 18P1 formed in backrest 18 as shown in FIG. 1A and a first side-belt passageway 19P1 formed in movable headrest 19 as shown in FIG. 1B, and then to extend downwardly to pass through a first side-belt passageway 16P1 formed in seat bottom 16 as shown in FIG. 1B to couple to crotch belt 20 as suggested in FIGS. 7 and 8. First side belt 21 includes a shoulder-gripping portion 21S that is arranged to wrap over the first shoulder of a child seated in juvenile seat 12.

Second side belt 22 is coupled to backrest 18 of seat back 17 and arranged to pass through a second side-belt passageway 18P2 formed in backrest 18 as shown in FIG. 1A, a second side-belt passageway 19P2 formed in movable headrest 19 as shown in FIG. 1B, and then extend downwardly through a second side-belt passageway 16P2 formed in seat bottom 16 as shown in FIG. 1A to couple to crotch belt 20 as suggested in FIGS. 7 and 8. Second side belt 22 includes a shoulder-gripping portion 22S that is arranged to wrap over the second shoulder of a child seated in juvenile seat 12.

First side belt 21 of child-restraint harness 14 includes an exposed belt section 21B that lies in a child-seating space 12S formed in juvenile seat 12 and a sliding latch plate 21P that is mounted for sliding movement on exposed belt section 21B as suggested in FIGS. 1A and 1B. Belt section 21B includes the shoulder-gripping portion 21S of first side belt 21. Sliding latch plate 21P includes a mount 21M and a tongue 21T as shown in FIG. 1B. Mount 21M engages and slides on exposed belt section 21B as suggested in FIGS. 1A and 1B. Tongue 21T mates with the buckle 32 provided at the free end 20E of crotch belt 20 to establish mating engagement of crotch belt 20 and first side belt 21 as shown in FIG. 1A.

Second side belt 22 of child-restraint harness 14 includes an exposed belt section 22B that lies in child-seating space 12S formed in juvenile seat 12 and a sliding latch plate 22P that is mounted for sliding movement on exposed belt section 22B as suggested in FIGS. 1A and 1B. Belt section 22B includes the shoulder-gripping portion 22S of second side belt 22. Sliding latch plate 22P includes a mount 22M and a tongue 22T as shown in FIG. 1B. Mount 22M engages and slides on exposed belt section 22B. Tongue 22T mates with the buckle 32 provided at the free end 20E of crotch belt 20 to establish mating engagement of crotch belt 20 and second side belt 22 as shown in FIG. 1A.

Crotch belt 20 of child-restraint harness 14 includes a crotch strap 30 coupled to seat bottom 16 and to first and second side belts 21, 22 as suggested in FIG. 8 and a buckle 32 coupled to the free end 20E of crotch strap 30 as suggested in FIG. 1B. Buckle 32 is configured to be coupled to tongue 21T of the first sliding latch plate 21P included in first side belt 21 when child-restraint harness 14 is in the CLOSED CHILD-RESTRAINING mode and tongue 22T of the second sliding latch plate 22P included in second side belt 22 when child-restraint harness 14 is in the CLOSED CHILD-RESTRAINING mode as suggested in FIG. 1A.

Side-belt mover 15 of child restraint 10 is configured to hold shoulder-gripping portions 21S, 22S of first and second side belts 21, 22 of child-restraint harness 14 automatically in a raised position above seat bottom 16 as suggested in FIG. 9 so that a caregiver can place a child easily in juvenile seat 12 under the raised side belts 21, 22 without having to use a hand or some other means to raise the side belts 21, 22 upwardly to allow the child to be placed unhindered in the seat 12. Side-belt mover 15 is also configured to cause automatic lowering of shoulder-gripping portions 21S, 22S first and second side belts 21, 22 toward seat bottom 16 to a lowered position after the child has been placed in juvenile seat 12 as suggested in FIG. 11 so that shoulder-gripping portions of 21S, 22S of first and second side belts 21, 22 are wrapped over the shoulders of the seated child and arranged to be mated with buckle 32 that is included in the free end 20E of the crotch belt 20 to restrain the child in the seat 12 without requiring the caregiver to handle the first and second side belts 21, 22 manually.

Side-belt mover 15 of child restraint 10 includes a base 50, a first side-belt position changer 51 coupled to first side belt 21, a second side-belt position changer 52 coupled to second side belt 22, and a movable actuator strap 53 as shown, for example, in FIGS. 6 and 7. Movable actuator strap 53 is arranged to interconnect crotch belt 20 and the first and second side-belt position changers 51, 52 that are linked to first and second side belts 21, 22 as suggested diagrammatically in FIG. 6. The first and second side-belt position changers 51, 52 cooperate to define a belt-motion controller for automatically raising and lowering shoulder-gripping portions 21S, 22S of first and second side belts 21, 22 of child-restraint harness 14 at the proper time during seating and unseating of a child by a caregiver in juvenile seat 12.

Movable actuator strap 53 is coupled first and second side-belt position changers 51, 52 as suggested diagrammatically in FIGS. 6 and 7. Movable actuator strap 53 is arranged to actuate first and second side-belt position changers 51, 52 to cause shoulder-gripping portions 21S, 22S of first and second side belts 21, 22 of child-restraint harness 14 to move between the raised and lowered positions relative to seat bottom 16 of juvenile seat 12 in response to movement of the free end 20E of the movable actuator strap 53 upwardly away from seat bottom 16 as suggested diagrammatically in FIG. 7.

First side-belt position changer 51 includes a first elastic strip 51S associated with and linked to shoulder-gripping portion 21S of first side belt 21 of child-restraint harness 14, a first webbing 51W having a lower end coupled to a free rearward end 53R of movable actuator strap 53 and an upper end coupled to an upper tip 51U of first elastic strip 51S, and several first-webbing retainer clips 51C as shown, for example in FIGS. 6 and 7. An upper portion of first side belt 21 is coupled to first elastic strip 51S move therewith by, for example, a tubular shoulder pad 21P, during movement of movable actuator strap 53 as suggested diagrammatically in FIGS. 6 and 7. First-webbing retainer clips 51C are coupled to first elastic strip 51S to allow for relative movement between first webbing 51W and first elastic strip 51S during movement of movable actuator strap 53 relative to seat bottom 16 and the resulting raising and lowering of shoulder-gripping portion 21S of first side belt 21 relative to seat bottom 16.

Second side-belt position changer 52 includes a second elastic strip 52S associated with and linked to shoulder-gripping portion 22S of second side belt 22 of child-restraint harness 14, a second webbing 52W having a lower end coupled to free rearward end 53R of movable actuator strap 53 and an upper end coupled to an upper tip 52U of second elastic strip 52S, and several second-webbing retainer clips 52C as shown, for example, in FIGS. 6 and 7. An upper portion of second side belt 22 is coupled to second elastic strip 52S to move therewith by, for example, a tubular shoulder pad 22P, during movement of movable actuator strap 53 as suggested diagrammatically in FIGS. 6 and 7. Second-webbing retainer clips 52C are coupled to second elastic strip 52S to allow for relative movement between second webbing 52W and second elastic strip 52S during movement of movable actuator strap 53 relative to seat bottom 16 and the resulting raising and lowering of shoulder-gripping portion 22S of second side belt 22 relative to seat bottom 16.

Each of elastic strips 51S, 52S has plastic characteristics and is fixed at one end to base 50 so as to allow these strips 51S, 52S to flex temporarily when deformed by a force applied by the companion webbings 51W, 52W as suggested in FIG. 7. Each of elastic strips 51S, 52S then returns to its resting position when such a force is no longer applied as suggested in FIG. 6. Each of the retainer clips 51C, 52C cooperate to provide a series of fixtures that allow the webbings 51W, 52W to be routed through fixed locations on the elastic strips 51S, 52S for the webbings 51W, 52W to be pulled against. Each webbing 51W, 52W is attached to the free rearward end 53R movable actuator strap 53 which moves when a pulling force is applied as a result of upward movement of the free end 20E of crotch belt 20 away from seat bottom 16 as suggested in FIGS. 6, 7, and 11. From the resting position shown in FIG. 6, when actuator strap 53 is moved, webbings 51W, 52W are pulled against webbing retainer clips 51C, 52C to shorten the amount of webbing and curling the two spring strips 51S, 52S as shown in FIG. 7.

After a caregiver has placed a child on seat bottom 16 of juvenile seat 12, the caregiver will move the free end 20E of crotch belt 20 of child-restraint harness 14 upwardly away from seat bottom 16 as suggested in FIG. 7 and such crotch belt 20 movement applies a pulling force to the forward end 53F of movable actuator strap 53. Such pulling movement of movable actuator strap 53 applies a downward force to the lower ends of each of the first and second webbings 51W, 52W. Such force is transferred by first webbing 51W to the tip 51U of first elastic strip 51S and by second webbing 52W to the tip 52U of second elastic strip 52S. Such a force transfer causes upper portions of each of first and second elastic strips 51S, 52S to curl in a forward and downward direction as shown, for example, in FIG. 7 so that: (1) the first side belt 21 that is linked to first elastic strip 51S by tubular shoulder pad 21S moves from the raised position shown in FIG. 2 (and suggested in FIG. 6) to the lowered position shown in FIG. 5 (and suggested in FIG. 7) and (2) the second side belt 22 that is linked to second elastic strip 52S by tubular shoulder pad 22S moves from the raised position shown in FIG. 2 (and suggested in FIG. 6) to the lowered position shown in FIG. 5 (and suggested in FIG. 7).

What is claimed is:

1. A child restraint comprising
   a juvenile seat including a seat bottom and a seat back extending upwardly from the seat bottom to provide a child-seating space,
   a child-restraint harness coupled to the juvenile seat, the child-restraint harness including a crotch belt and first and second side belts configured to mate with the crotch belt in a closed child-restraining mode to restrain a child seated in the child-seating space of the juvenile seat, and
   side-belt mover means for automatically raising shoulder-gripping portions of the first and second side belts located above the seat bottom to open the child-seating space to receive a child to be seated on the seat bottom so that an opened child-seating-and releasing mode of the child-restraint harness is established and for lowering the shoulder-gripping portions of the first and second side belts automatically to engage shoulders of a child seated in the child-seating space in response to movement of the crotch belt relative to the seat bottom and toward mating engagement with the first and second side belts so that the closed child-restraining mode of the child-restraint harness is established.

2. The child restraint of claim 1, wherein the side-belt mover includes a base arranged to underlie a child seated on the seat bottom, a first side-belt position changer coupled to the base and linked to the shoulder-gripping portion of the first side belt, a second side-belt position changer coupled to the base and linked to the shoulder-gripping portion of the second side belt, and an actuator strap having a forward end coupled to the crotch belt and a rearward end coupled to the first and second side-belt position changers.

3. The child restraint of claim 2, wherein the actuator strap is arranged to lie between the base and the seat bottom.

4. The child restraint of claim 2, wherein a portion of the first side-belt changer and a portion of the shoulder-gripping portion of the first side belt pass through a passageway formed in a tubular shoulder pad included in the child-restraint harness to link the first side-belt position changer to the shoulder-gripping portion of the first side belt.

5. The child restraint of claim 2, wherein the first side-belt position changer includes an upper portion coupled to the shoulder-gripping portion of the first side belt and a lower portion coupled to the rearward end of the actuator strap.

6. The child restraint of claim 5, wherein the second side-belt position changer includes an upper portion coupled to the shoulder-gripping portion of the second side belt and a lower portion coupled to the rearward end of the actuator strap.

7. The child restraint of claim 5, wherein the upper portion of the first side-belt position changer includes a first elastic strip coupled to the base, an upper section of a first webbing arranged to extend along the first elastic strip, and retainer clips coupling the upper section of the first webbing to the first elastic strip to allow movement of the upper section of the first webbing relative to the first elastic strip during change of the child-restraint harness between the closed child-restraining mode and the opened child-seating-and-releasing mode and wherein the lower portion of the first side-belt position changer includes a lower section of the first webbing arranged to interconnect the rearward end of the actuator strap and the upper section of the first webbing.

8. The child restraint of claim 7, wherein the lower section of the first webbing is arranged to lie between the base and the seat bottom.

9. The child restraint of claim 7, wherein the first elastic strip is arranged to lie between the first webbing and the first side belt.

10. The child restraint of claim 7, wherein the child-restraint harness further includes a first tubular pad formed to include a passageway extending therethrough and each of the shoulder-gripping portion of the first side belt, the first elastic strip, and the upper section of the first webbing extend through the passageway of the first tubular pad to couple the upper portion of first side-belt position changer to the shoulder-gripping portion of the first side belt.

11. The child restraint of claim 5, wherein the upper portion of the second side-belt position changer includes a second elastic strip coupled to the base, an upper section of a second webbing arranged to extend along the second elastic strip, and retainer clips coupling the upper section of the second webbing to the second elastic strip to allow movement of the upper section of the second webbing relative to the second elastic strip during change of the child-restraint harness between the closed child-restraining mode and the opened child-seating-and-releasing mode and wherein the lower portion of the second side-belt position changer includes a lower section of the second webbing arranged to interconnect the rearward end of the actuator strap and the upper section of the second webbing.

12. The child restraint of claim 7, wherein the child-restraint harness further includes a second tubular pad formed to include a passageway extending therethrough and each of the shoulder-gripping portion of the second side belt, the second elastic strip, and the upper section of the second webbing extend through the passageway of the second tubular pad to couple the upper portion of second side-belt position changer to the shoulder-gripping portion of the second side belt.

13. The child restraint of claim 11, wherein the base is formed to include separate first and second upper apertures along an upper portion of the base that is coupled to the first and second elastic strips, the base is also formed to include a lower aperture along an opposite lower portion of the base, the first webbing is arranged to extend through the first upper aperture to locate the lower section of the first webbing between the base and the juvenile seat and the first elastic strip between the upper section of the first webbing and the juvenile seat, and the second webbing is arranged to extend through the second upper aperture to locate the lower section of the second webbing between the base and the juvenile seat and the second elastic strip between the upper section of the second webbing and the juvenile seat, and the crotch belt extends through the lower aperture.

14. The child restraint of claim 11, wherein the base and the first and second elastic strips cooperate to form a monolithic component made of an elastic material and each of the first and second elastic strips is cantilevered to the base to cause the first and second elastic strips to lie in laterally spaced-apart relation to one another.

15. The child restraint of claim 2, wherein a first elastic strip is included in the first side-belt position changer and a second elastic strip is included in the second side-belt position chamber, and the first elastic strip is arranged to apply a lifting force to the shoulder-gripping portion of the first side belt and the second elastic strip is arranged to apply a lifting force to the shoulder-gripping portion of the second side belts to hold the shoulder-gripping portions normally in raised positions above the seat bottom, and wherein the first side-belt position changer further includes a first webbing having a lower end coupled to the rearward end of the actuator strap and an upper end coupled to a distal tip of the first elastic strip included in the first side-belt position changer and retainer clips linking the first webbing to the first elastic strip to allow relative movement therebetween, and the second side-belt position changer further includes a second webbing having a lower end coupled to the rearward end of the actuator strap and an upper end coupled to a distal tip of the second elastic strip included in the second side-belt position changer and retainer clips linking the second webbing to the second elastic strip to allow relative movement therebetween and wherein upward movement of a free end of the crotch belt to mate with latch plates included in the child-restraint harness and coupled to the first and second side belts applies a pulling force to the forward end of the actuator strap and such a pulling force is transferred to the distal tip of the first elastic strip by the first webbing to cause the first elastic strip to curl away from the seat back and toward the base and to the distal tip of the second elastic strip by the second webbing to cause the second elastic strip to curl away from the seat back and toward the base, and wherein the shoulder-gripping portion of the first side belt is pulled downwardly to a lowered position to wrap over a first shoulder of a child seated in the juvenile seat by the curled first elastic strip and the shoulder-gripping portion of the second side belt is pulled downwardly to a lowered position to wrap over a second shoulder of a child seated in the juvenile seat by the curled second elastic strip.

16. The child restraint of claim 14, wherein each of the elastic strips is made of a resilient elastic material that will change from a curled shape to recover a first shape to support the gripping portions of the first and second side belts in the raised positions in response to disengagement of the free end of the crotch belt and the latch plates on the first and second side belts so as to facilitate removal of a child from the juvenile seat by a caregiver.

17. The child restraint of claim 1, wherein the side-belt mover means includes an actuator strap having a forward end coupled to the crotch belt and a rearward end, a first side-belt position changer including an upper portion coupled to the first side belt and a lower portion coupled to the rearward end of the actuator strap, and a second side-belt position changer including an upper portion coupled to the second side belt and a lower portion coupled to the rearward end of the actuator strap, and the first side-belt position changer is configured to hold the first side belt normally in the raised position above the seat bottom and the second side-belt position changer is configured to hold the second side belt normally in the raised position above the seat bottom so that a child can be seated by a caregiver in the juvenile seat on the seat bottom without requiring the caregiver to grasp the first and second belts manually and hold them in the raised positions above the seat bottom.

18. The child restraint of claim 17, wherein the actuator strap is arranged to be moved relative to the seat bottom to apply a pulling force to the first and second side-belt position changers to cause the first and second side-belt position changers to cooperate and move the shoulder-gripping portions of the first and second side belts to lowered positions contacting the shoulders of a child seated in the child-seating space in response to upward movement of a free end of the crotch belt away from the seat bottom toward mating engagement with each of the first and second side belts.

19. The child restraint of claim 18, wherein the side-belt mover means further includes a base coupled to the juvenile seat and the first side-belt position changer includes a first elastic strip coupled to the base and associated with the first side belt of the child-restraint harness and the first elastic strip is arranged normally to hold the first side belt in the raised position.

20. The child restraint of claim 19, wherein the first side-belt position changer further includes a first webbing arranged to extend along the underside of the first elastic strip and coupled to a tip of the first elastic strip to cause a downward force to be applied by the first webbing to the tip of the first elastic strip in response to upward movement of the free end of the crotch belt toward mating engagement with each of the first and second side belts, so that the first side belt is curled to assume a curved shape and wrapped over a shoulder of a child seated in the child-seating space to assume the lowered position.

21. The child restraint of claim 20, wherein the first side-belt position changer further includes several first webbing retainer clips for coupling the first webbing to the topside of the first elastic strip to allow for relative movement between the first webbing and the first elastic strip during raising and lowering of the first side belt.

22. The child restraint of claim 21, wherein the second side-belt position changer includes a second elastic strip coupled to the base and associated with the second side belt, a second webbing extending the underside of the second elastic strip to pass through a second upper slot formed in the base to locate a lower end of the second webbing under the base, and several second webbing retainer clips for coupling the second webbing to the second elastic strip to allow for relative movement between the second webbing and the second elastic strip during raising and lowering of the second side belt.

23. The child restraint of claim 18, wherein the actuator strap is located below the base, the base is formed to include a lower slot and a first upper slot, the crotch belt extends through the lower slot to locate the free end of the crotch belt above the base and a proximal end of the crotch belt below the base, the first webbing extends through the first upper slot to locate an upper end above the base to mate with the tip of the first elastic strip and a lower end below the base to mate with a free rearward end of the actuator strap, and the proximal end of the crotch belt is mated with a forward end of the actuator strap.

* * * * *